US006973172B1

(12) United States Patent
Bitove et al.

(10) Patent No.: US 6,973,172 B1
(45) Date of Patent: Dec. 6, 2005

(54) METHOD FOR PROVIDING A QUANTITY OF TELEPHONE TIME FROM AN ATM OR POS TERMINAL

(75) Inventors: Thomas John Bitove, Toronto (CA); Rick Kojfman, Toronto (CA); Steven Richard Winch, King (CA); Peter Adamson Walcot, Norval (CA)

(73) Assignee: Wireless Airtime Direct Corporation, Toronto (CA)

( * ) Notice: Subject to any disclaimer, the term of this patent is extended or adjusted under 35 U.S.C. 154(b) by 35 days.

(21) Appl. No.: 09/662,166

(22) Filed: Sep. 14, 2000

(30) Foreign Application Priority Data

Mar. 29, 2000 (CA) .................................. 2303041

(51) Int. Cl.[7] ......................... H04M 15/00; G06F 17/60
(52) U.S. Cl. ............................. 379/114.2; 379/114.19; 705/43; 705/44
(58) Field of Search ...................... 379/114.01, 114.02, 379/114.06, 114.1, 114.14, 114.15, 114.16, 379/114.17, 114.18, 114.2, 114.19, 144.01, 379/144.04; 235/380, 381; 705/39, 40, 25, 705/26, 43, 42, 44, 45; 455/405, 406

(56) References Cited

U.S. PATENT DOCUMENTS

| 4,706,275 | A |   | 11/1987 | Kamil |
| 4,899,373 | A |   | 2/1990  | Lee et al. |
| 5,025,139 | A |   | 6/1991  | Halliburton et al. |
| 5,068,891 | A |   | 11/1991 | Marshall |
| 5,181,238 | A |   | 1/1993  | Medamana et al. |
| 5,352,876 | A |   | 10/1994 | Watanabe et al. |
| 5,440,108 | A |   | 8/1995  | Tran et al. |
| 5,450,477 | A |   | 9/1995  | Amarant et al. |
| 5,511,114 | A |   | 4/1996  | Stimson et al. |
| 5,563,934 | A |   | 10/1996 | Eda |
| 5,577,109 | A |   | 11/1996 | Stimson et al. |
| 5,621,787 | A | * | 4/1997  | McKoy et al. .............. 379/144 |
| 5,673,309 | A |   | 9/1997  | Woynoski et al. |
| 5,684,291 | A |   | 11/1997 | Taskett |
| 5,696,908 | A | * | 12/1997 | Muehlberger et al. . 379/114.01 |
| 5,721,768 | A |   | 2/1998  | Stimson et al. |
| 5,722,067 | A | * | 2/1998  | Fougnies et al. .......... 379/114 |
| 5,749,075 | A |   | 5/1998  | Toader et al. |
| 5,762,376 | A |   | 6/1998  | Taskett |
| 5,825,863 | A |   | 10/1998 | Walker |
| 5,868,236 | A |   | 2/1999  | Rademacher |
| 5,903,633 | A |   | 5/1999  | Lorsch |
| 5,909,486 | A |   | 6/1999  | Walker et al. |
| 5,923,734 | A |   | 7/1999  | Taskett |
| RE36,365  | E |   | 11/1999 | Levine et al. |
| 5,988,509 | A |   | 11/1999 | Taskett |
| 5,991,413 | A |   | 11/1999 | Arditti et al. |
| 5,991,748 | A |   | 11/1999 | Taskett |
| 6,028,920 | A |   | 2/2000  | Carson |
| 6,044,247 | A |   | 3/2000  | Taskett et al. |
| 6,081,791 | A | * | 6/2000  | Clark ........................... 705/43 |
| 6,370,240 | B1 | * | 4/2002 | Woynoski et al. ..... 379/144.01 |
| 6,473,500 | B1 | * | 10/2002 | Risafi et al. ........... 379/144.01 |
| 2001/0023415 | A1 | * | 9/2001 | Keil ....................... 379/144.01 |

FOREIGN PATENT DOCUMENTS

| CA | 2222749       | 12/1996 |
| CA | 2222762       | 12/1996 |
| EP | 1 030 274 A1  | 4/1997  |
| WO | WO 95/34161   | 12/1995 |
| WO | WO 96/41462   | 12/1996 |
| WO | WO 98/01815   | 1/1998  |
| WO | WO 98/47112   | 10/1998 |
| WO | WO 99/23622   | 5/1999  |
| WO | WO 00/11568   | 3/2000  |

OTHER PUBLICATIONS

A copy of a press release, dated Jul. 28, 1999 entitled "First Union Offers Prepaid Calling Vouchers at ATMs".
A copy of an article entitled "Prepaid and ATM's—the Sequel" from Intele-card New Magazine dated Dec., 1999 (see p. 60).
A copy of an article entitled Point-of-Sale Activation from Intele-card Magazine dated Dec., 1999 (pp. 87, 88, 90, 92, 96, 98, 100, 101, 102, and 103).

(Continued)

Primary Examiner—Rexford Barnie
(74) Attorney, Agent, or Firm—Gowling Lafleur Henderson LLP; D. Doak Horne

(57) ABSTRACT

A method for providing a quantity of pre-paid telephone time from an automated teller machine (ATM) or a point-of-sale device (POS terminal), to a patron of either of such device. PIN numbers, obtained from a telephone service provider and each designating a pre-paid quantity of telephone service time, are made available to the ATM or POS terminal. The patron is queried by the device if he/she wishes to purchase telephone time. Upon selection of a quantity of pre-paid telephone time by a patron and payment for such purchased quantity of time, the device selects a particular PIN number having an associated quantity of telephone time corresponding to the quantity of telephone service time purchased by the patron, and provides such PIN number to the patron. In a preferred embodiment the PIN number is provided to the patron by being printed out on the ATM's existing account statement printer, or on the account statement printer of a POS terminal if a POS device is alternatively employed. An ATM to permit patrons of such ATM to purchase a quantity of telephone time from one of a plurality of telephone service providers is further disclosed.

29 Claims, 4 Drawing Sheets

OTHER PUBLICATIONS

A copy of press release, dated Feb. 2, 2000 entitled "Vendtek Announces Sale Of Prepaid Cellular System".

A copy of a press release dated Mar. 6, 2000 entitled "VeriFone and AirTIME Team up to Provide Pre-Paid Sevices to Merchants".

A copy of a press release dated May 8, 2000 entitled "Celluphone Selects J&J Beeper, Los Angeles, California, To Start The Debisys Prepaid Cellular Pin Distribution Program Beta Test".

A copy of a press release dated Jun. 6, 2000 entitled "Blackstone Online Selects Hypercom ePic ICE Card Payment Terminals as Platform for New POS Prepaid Services Activation Program"; and.

A copy of an article dated Sep. 2000 entitled "High-Tech Sizzle At The Point of Sale".

* cited by examiner

METHOD FOR PROVIDING A QUANTITY OF TELEPHONE TIME FROM AN ATM OR POS TERMINAL

FIELD OF THE INVENTION

The present invention relates to a method for providing a pre-paid quantity of telephone time to a customer via an automated teller machine (ATM) or a POS terminal, and an ATM adapted for such purpose.

BACKGROUND OF THE INVENTION

Pre-paid telephone access codes, and the automated vending to the public of telephone cards bearing such pre-paid telephone access codes, have been in use in various forms since at least as early as 1972.

A typical example of an automated means for dispensing a pre-paid telephone card is disclosed in U.S. Pat. No. 5,696,908. Such patent discloses a microprocessor controlled vending machine, which in return for provision of federal reserve notes or provision of a debit or credit card for electronic funds transfer payment, dispenses a telephone card having an access code for a selected telephone service provider. In the preferred embodiment the access code is provided to the telephone service provider by the vending machine via a real-time communication with the telephone service provider at the time the card is being dispensed, to allow the card/code to be immediately activated by the telephone service provider for the quantity of purchased telephone time. As may be seen from col. 7, lines 38–40, the machine may dispense the access code through a printer port 34 or display such code via a visual display 32, rather than dispense a phone card 12 bearing such code.

As another typical example of a prior art telephone card vending machine, U.S. Pat. No. 5,868,236 discloses a phone card vending machine which dispenses a phone card as well as a slip receipt that contains information about the value of service purchased, and on which an activated access code is printed.

Disadvantageously, each of the devices disclosed in U.S. Pat. Nos. 5,696,908 and 5,868,236 relate to a dedicated vending machine for dispensing phone cards. Such dedicated machines are thus costly in that they do nothing else but dispense phone cards, and require an outlay of capital to purchase. They cannot therefore economically be ubiquitously provided at numerous locations such as at airports, train stations, bus terminals and the like, to allow ready access by customers needing to purchase telephone time at such locations.

Use of devices other than specially dedicated phone card dispensers, such as automated/automatic teller machines (ATM's) to dispense specially adapted telephone cards, are known. For example, U.S. Pat. No. 5,673,309 teaches a system whereby an ATM is provided with telephone card sheetlets. Each of the sheetlets has a coefficient of friction differential between opposed surfaces thereof which enables the sheetlets to be dispensed as individual sheetlets from an ATM in a manner identical to paper money, which allows an ATM to be used for dispensing pre-paid phone cards as an alternate to its normal money dispensing function. The ATM disclosed in U.S. Pat. No. 5,673,309 must be of a multiple bin or multiple drawer configuration (col. 4, lines 4–7) in order to permit one bin to contain paper money be dispensed, and the other bin to contain the sheetlets. Accordingly, although U.S. Pat. No. 5,673,309 discloses a system which dispenses telephone access codes [ie. personal identification numbers (PIN's)] for pre-paid quantities of telephone time via an ATM and thereby overcomes the disadvantages of U.S. Pat. Nos. 5,696,908 and 5,868,236 in having to otherwise acquire a dedicated apparatus to dispense pre-paid telephone time. Disadvantageously, however, the system of U.S. Pat. No. 5,673,309 is limited to ATM's of a particular configuration. In particular, the system taught in U.S. Pat. No. 5,673,309 is limited to ATM's having at least two (ie multiple) bins to hold both money, and sheetlets. Moreover, the system of U.S. Pat. No. 5,673,309 requires use of specially-adapted sheetlets which must be specially supplied to the ATM's to permit them to dispense pre-paid telephone access codes.

Can. Pat. Application 2,222,749, entitled "Methods and Apparatus for Providing a Pre-paid, Remote Entry Customer Account" discloses an ATM (202) that in one embodiment is used to print an immediately-activated authorization code on a receipt (referred to as an "instrument" 100) which is provided to a purchaser. Such authorization code, when provided by the purchaser to a telephone service provider 208 along with a dialed number, permits the purchaser to carry on conversation with a party at such dialed number up to the limit of the purchased time. Importantly, ATM (202) is in communication with service provider 208 via direct hardware link 209 (typically a modem communication link), or alternatively to a network host 230, with host 230 being connected to service provider 208 via link hardware/communication link 232. This feature permits telephone service provider 208 to keep track of authorization codes dispensed at the time of purchase and simultaneously to activate them at the time of dispensing (printing) to the customer. This system does not use the ATM, or the financial institution which operates the ATM and in respect of which the ATM may physically communicate with, to store pre-printed cards having authorization (access) codes already printed thereon. Instead, it allows the authorization number to be immediately activated by the telephone service provider at the time of dispensation to the customer for immediate use by the customer. The interactive link 209/232 between the telephone service provider 208 and the ATM 202 further allows the capability of providing the customer with any quantum of pre-paid telephone time he/she may wish to purchase, rather than the purchaser only being able to select the telephone time from a limited selection of pre-determined quantities of telephone time.

Disadvantageously, however, in order to operate, the system and apparatus disclosed in Can. Pat. 2,222,749 as discussed above requires a hardware communication link 232 between the ATM and each of the telephone service providers 208 with whom a customer is given the option of purchasing pre-paid telephone time from. Accordingly, creating this communication link 232 between each ATM and each and every telephone service provider 208 who desires to vend pre-paid telephone time via such ATM's represents considerable added expense in implementing such a system. Due to the added expense, few ATM's are adapted to utilize this system, creating a serious problem in availability to potential users desiring to purchase telephone time through automated vending machines, including ATM's.

SUMMARY OF THE INVENTION

The present invention, in one of its broad embodiments, provides a method of vending pre-paid telephone time to customers through the many existing ATM machines already conveniently located at airports, train stations, banks, shopping centres, and the like, with no physical modification to existing ATM's or their hardware, other than through software modifications on the ATM and/or the network host of the financial institution through which each ATM is connected.

In addition, the invention further discloses a method by which telephone service time may be purchased from a point-of-sale (POS) terminal which is available at retail purchase counters and which typically have a display screen and a printer capability for printing a receipt, which heretofore have only been used by customers in association with a debit card to debit funds from a bank account for purchase of retail items. Such method hereinafter disclosed requires no physical communication link between the POS terminal and a telephone service provider in order for the customer to be provided with a PIN number.

Accordingly, in one of the broad embodiments of the invention, such invention comprises a method for providing a fixed quantity of pre-paid telephone time from a device comprising a conventional automated teller machine (ATM) or a point-of-sale (POS) terminal, having a display screen and printing capability and a pre-existing communication capability with an existing computer system operated by a financial institution such as a bank, to a patron of said device who accesses said device through provision to said device of an encoded card and first personal identification number (PIN), without hardware modifications to said device, hardware additions to said existing system, or additional communication links, comprising the steps of:

a) making available to said device a plurality of pre-assigned second PIN numbers, each of said second PIN numbers adapted, when provided by said patron during a telephone call to a telephone service provider, to allow telephone service for the patron for a period of time up to said quantity of pre-paid time;

b) querying said patron of said device as to whether the patron wishes to purchase telephone time;

c) verifying that the patron has sufficient funds to purchase said quantity of telephone time, and charging such funds for said quantity of time;

d) upon satisfaction of c) above, selecting one of said plurality of second PIN numbers; and e) printing said selected second PIN number and providing it to such patron via an account statement printer used in association with said device.

Advantageously, using the above method, no hardware link is required between the device which dispenses the PIN (ie the access code) and the telephone service provider from whom the pre-paid telephone time is purchased. Instead, it is contemplated that the customer will, after purchasing the PIN number from the device, provide the PIN number dispensed by the device to the telephone service provider at the time of placing a call to a desired number (or shortly prior to placing the call in the manner as later explained herein), thereby permitting the telephone company to initially credit the customer's account with the purchased time and thereafter commence "debiting" the customer's account corresponding to the purchased authorization code, for the duration of such call, and for all further telephone calls, until such pre-paid telephone time is exhausted. This approach has the added advantage in that it permits telephone service providers, in the case of wireless telephones and patrons who provide the telephone service provider with their purchased PIN number using their wireless telephone, to correlate the frequency and identification code of the incoming wireless call with the purchased PIN number, thereafter eliminating the need for the patron to advise the telephone service provider of his/her PIN number every time a call is dialed/placed.

As well, the method as above described does not require supply of specially-adapted sheetlets, instead printing the authorization code (PIN number) on paper via the existing account statement printer existing on nearly all ATM machines or associated with all POS devices.

Where a POS Terminal is used, having a pre-existing communication capability with a financial institution and having an associated printer for printing receipts and the like as typically employed by retailers, the step of making the second PIN number available comprises storing said second PIN numbers on a database which is maintained by the financial institution and which is capable of being accessed by the POS terminal.

In a further preferred embodiment of the above method, the patron is given the opportunity to purchase not just a fixed quantity of telephone time, but the ability to select from a variety of pre-determined quantities of telephone time. Accordingly, in such preferred method, the plurality of second PIN numbers from which the device (POS Terminal or ATM unit) may select on behalf of a customer comprises a plurality of groups of second PIN numbers. Each second PIN number in a respective group of said groups of second PIN numbers permits telephone service for a pre-determined quantity of time, and each second PIN number within a respective group providing a different quantity of pre-paid telephone time than second PIN numbers within another group. The patron in step b) above is further queried as to what quantity of a number of pre-defined quantities of telephone time such patron wishes to purchase; and in response to input from said patron as to the particular quantity of telephone time desired to be purchased, a second PIN number is selected from a respective group of second PIN numbers which provides telephone time corresponding to the particular quantity of pre-defined quantities of telephone time selected by said patron. This selected second PIN number is, after verification that the patron possesses sufficient funds or has provided a valid credit card with an unexceeded limit, then printed and provided to the patron via the device's existing account statement printer.

In another embodiment of the method of the present invention, it is desired to give the patron the option of not only purchasing a variety of pre-determined quantities of telephone time, but further the option of purchasing a variety of pre-determined quantities of telephone time from a variety of telephone service providers. This capability is extremely desirable as it is an added convenience to patrons, particularly where the patron is in possession of a wireless telephone which can only be operated through a particular service provider, and wishes to utilize the particular method of the invention (described supra) which allows the patron to simply contact his/her telephone service provider only once to advise of his/her purchased PIN number and thereafter need not advise his/her telephone service provider of the PIN number for each and every subsequent dialed telephone call.

Accordingly, in another aspect of the present invention wherein the patron may select to purchase time from a selection of telephone service providers, and may further select to purchase a particular quantity of pre-paid telephone time from a variety of pre-defined telephone times, the present invention in this particular aspect providing a method for providing a quantity of pre-paid telephone time from a device comprising an automated teller machine (ATM) or a point-of-sale terminal to patrons of said device, comprising in combination:
- a) ordering a pre-determined amount of telephone time from a plurality of telephone service providers, and further obtaining from each telephone service provider a plurality of groups of second PIN numbers, each of said second PIN numbers when provided to a patron of such device and subsequently supplied by the patron to the telephone service provider adapted to allow telephone service for said patron for a pre-determined quantity of time, each of said second PIN numbers having associated therewith a pre-determined quantity of time for which telephone service will be enabled, said pre-determined quantity of time associated with second PIN numbers within one group of said plurality of groups being different from the pre-determined quantity of time associated with second PIN numbers within another of said groups of unique second PIN numbers;
- b) querying a patron of said device, who accesses the device by providing the device with an encoded card and a first PIN number, as to whether the patron wishes to purchase telephone time;
- c) in response to a positive reply to the aforesaid query, providing the patron with a plurality of telephone service providers to select from;
- d) providing to the patron a plurality of pre-defined quantities of telephone times which may be purchased, and requesting the patron select a particular pre-defined quantity of telephone time;
- e) in response to input from said patron as to the quantity of time selected, querying said patron as to whether the patron desires to charge the patron's credit card or debit the patron's bank account;
- f) in the event that the patron desires to charge the patron's bank account, verifying that the patron has sufficient funds to purchase said quantity of telephone time, and debiting such account;
- g) in the event the patron desires to charge the patron's credit card, verifying that the quantity of time desired to be purchased may be charged to said credit card, and charging said credit card;
- h) upon satisfaction of f) or g) above, selecting a second PIN number from a selected group of said plurality of groups of second PIN numbers, said selected group corresponding to a group of second PIN numbers associated with said selected telephone service provider and said selected quantity of telephone service time; and
- i) providing said selected second PIN number to such patron.

The step of providing the selected second PIN number to the patron [step i) above] may comprise providing it to the patron by displaying it on the device's cathode ray tube or liquid crystal display. However, in the preferred embodiment of this particular aspect of the invention, the step of providing the second PIN number to the patron comprises printing the selected second PIN number on the device's existing account statement printer, and thereafter providing it to said patron, where such ATM or POS Terminal additionally has a printer.

Advantageously, as mentioned above, the method of the present invention wherein the patron is provided with a PIN, and thereafter provides such PIN to his/her telephone service provider is particularly adapted for a method whereby the patron in possession of a wireless telephone need only provide his/her purchased PIN number once to his/her telephone service provider, and thereafter may place calls without having to further dial in the patron's purchased PIN number at the time of placing a call.

Accordingly, in a further aspect of the present invention, a method is provided for crediting, via an automated teller machine (ATM) or POS Terminal, a quantity of pre-determined telephone time to a patron who possesses a wireless telephone having a pre-assigned telephone number, which permits said patron, after the initial provision of a second personal identification number (PIN) to a telephone service provider, to thereafter utilize said telephone for a period of time up to said quantity of pre-determined quantity of telephone time without having at the time of each subsequent telephone call to provide said telephone service provider with said second PIN number prior to being permitted to make said telephone call, which comprises in combination:
- a) querying a patron of a device comprising an ATM or a POS Terminal, who accesses the device through provision to the ATM or POS terminal of an encoded card and a first personal identification number (PIN), as to whether the patron wishes to purchase telephone time and what quantity of telephone time;
- b) in response to input from said patron as to said quantity of time desired to be purchased, querying said patron as to whether the patron desires to charge the patron's credit card or to debit the patron's bank account;
- c) in the event that the patron desires to charge the patron's bank account, verifying through an electronic clearing house that the patron has sufficient funds to purchase said quantity of telephone time, and debiting said bank account for said quantity of time;
- d) in the event the patron desires to charge the patron's credit card, verifying through an electronic clearing house that the quantity of time desired to be purchased may be charged to said credit card, and charging said credit card for said quantity of time;
- e) upon satisfaction of c) or d) above, selecting said second PIN number from a plurality of second PIN numbers, each of said second PIN numbers adapted, when supplied by said patron during a telephone call to a telephone service provider, to allow telephone service for the patron for a period of time up to said quantity of purchased time;
- f) providing said selected second PIN number it to such patron;
- g) receiving said second PIN number from said patron;
- h) correlating the pre-assigned telephone number of said wireless telephone with a corresponding account held by said telephone service provider in respect of said patron; and
- i) crediting said account with said quantity ofpre-determined telephone time purchased by said patron as ascertained from said second PIN number.

Again, the step of providing the selected second PIN number to the patron may comprise displaying it on the device's display screen, but in the preferred embodiment comprises printing the selected second PIN number on the device's existing account statement printer, and thereafter providing it to said patron.

More specifically, such further method of the invention comprises a method for crediting, via a device comprising a conventional POS terminal or an ATM, having pre-existing communication capability with an existing computer system operated by a financial institution such as a bank, a quantity of pre-determined telephone time to a patron who possesses a wireless telephone having a pre-assigned telephone number, which permits said patron, after the initial provision by said patron of a second personal identification number (PIN) to a telephone service provider, to thereafter utilize said telephone for a period up to said quantity of pre-determined quantity of telephone time without having at the time of each subsequent telephone call to provide said telephone service provider with said second PIN number prior to being permitted to make said telephone call, without hardware modifications to said device, hardware additions to said existing system, or additional communication links to a telephone service provider, which comprises in combination:

a) querying a patron of said device, who accesses said terminal through provision to the terminal of an encoded card and a first personal identification number (PIN), as to whether the patron wishes to purchase telephone time and what quantity of telephone time;

b) querying said patron as to said quantity of time desired to be purchased;

c) verifying that the patron has sufficient funds to purchase said desired quantity of telephone time;

d) debiting such funds;

e) selecting said second PIN number from a plurality of second PIN numbers, each of said second PIN numbers adapted, when supplied by said patron during a telephone call to a telephone service provider, to allow telephone service for the patron for a period of time up to said quantity of purchased time;

f) providing said selected second PIN number to such patron;

g) receiving said second PIN number from said patron;

h) correlating the pre-assigned telephone number of said wireless telephone with a corresponding account held by said telephone service provider in respect of said patron; and i) crediting said account with said quantity of pre-determined telephone time purchased by said patron as ascertained from second PIN number.

Using the method of the invention as described above, when a patron places a telephone call to his/her telephone service provider (the same telephone service provider from whom he/she purchased the second PIN number) on the patron's wireless telephone, because each wireless telephone has a specific frequency and identification code, the telephone service provider is able to, in accordance with the method of the present invention, correlate the supplied PIN with an existing account held by that particular patron/subscriber with the telephone service provider by referencing the PIN and identification code of the patron's wireless telephone with the telephone company's records for the subscribed patron having the particular wireless telephone number (ESN and/or MIN). Thereafter, having then credited the patron's account with the quantity of purchased time as indicated from the purchased PIN, the telephone company need not thereafter by provided at the time of a placed call with the PIN number. Rather, by acknowledging the wireless telephone identification code when the call is placed, the telephone service provider can ascertain the identity of the caller and debit the caller/patron's account for the duration of all subsequently placed calls, up to the amount of pre-paid telephone time which had been credited to the patron's account.

In a further aspect of the invention, the invention comprises an ATM (programmed itself or directed by a network computer to which the ATM is connected) which is adapted to permit patrons of such ATM to purchase a quantity of telephone time from one of a plurality of telephone service providers, wherein such ATM is adapted to dispense a personal identification number (PIN), said PIN adapted, when supplied to a telephone service provider, to allow telephone service for said patron for said quantity of time, wherein the ATM operates in the following manner, namely:

a) queries a patron who accesses the ATM through provision to the ATM of an encoded card and a first personal identification number (PIN), as to whether the patron wishes to purchase telephone time and what quantity of telephone time;

b) in response to input from said patron as to said quantity of time desired to be purchased, querying said patron as to whether the patron desires to charge the patron's credit card or to debit the patron's bank account;

c) in the event that the patron desires to charge the patron's bank account, verifying through an electronic clearing house that the patron has sufficient funds to purchase said quantity of telephone time, and debiting said bank account for said quantity of time;

d) in the event the patron desires to charge the patron's credit card, verifying through an electronic clearing house that the quantity of time desired to be purchased may be charged to said credit card, and charging said credit card for said quantity of time;

e) upon satisfaction of c) or d) above, selecting a second PIN number from a plurality of groups of second PIN numbers, each of said second PIN numbers within a group of second PIN numbers having associated therewith a pre-determined quantity of time for which telephone service will be enabled, said predetermined quantity of time associated with said second PIN numbers within one group of said plurality of groups being different from the pre-determined quantity of time associated with second PIN numbers within another of said groups of second PIN numbers; said selected second PIN number adapted, when supplied by said patron during a telephone call to a telephone service provider, to thereafter allow telephone service for the patron for a period of time up to said quantity of purchased time; and f) providing said selected second PIN number to such patron.

Again, the step of providing said selected second PIN number to said patron may comprise displaying such PIN number on the ATM's display screen, but in the preferred embodiment comprises printing said second PIN number on paper normally used for account statement print-outs, and providing it to said patron.

DESCRIPTION OF THE DRAWINGS

The invention will be better understood having reference to the accompanying drawings depicting non-limiting particular embodiments of the invention, as well as the following detailed description, wherein.

DETAILED DESCRIPTION OF THE INVENTION

Figure 3:
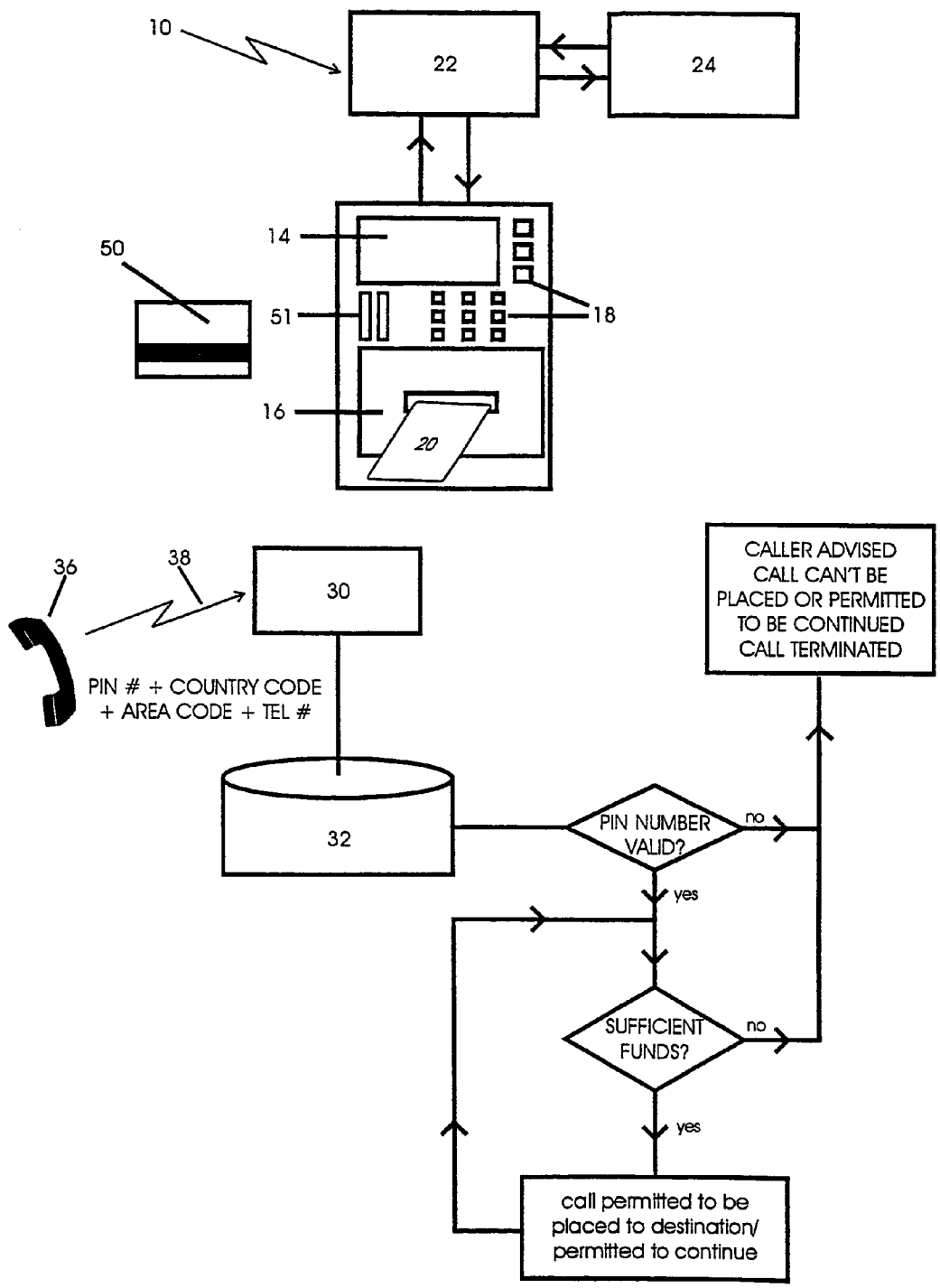
FIG. 3 is a schematic illustration of the components and apparatus used in the method of the present invention, where the device being used to dispense the PIN is an ATM.

FIG. 3 shows apparati 10 for use in the method of the present invention where the device being used to dispense the PIN is an ATM. An automated/automatic teller machine (ATM) 12 of the type commonly employed by financial institutions is shown, having a cathode ray tube, liquid crystal, or other type of visual display screen 14, a keypad comprising a series of buttons 18 for inputting selections and keying in numbers, and an account statement printer 16. Such ATM 12 is typically linked to a network host computer 22 operated by the financial institution or bank with which the ATM 12 is associated, for permitting clients of such financial institution to access their accounts with such financial institution via such ATM 12. Such ATM 12 either itself or through the network host computer 22 as shown in FIG. 3 is typically linked to an electronic clearing house 24 to provide interface with accounts held by other financial institutions other than the financial institution with which ATM 12 may be associated.

A patron typically accesses the ATM 12 through provision of an encoded card 50, and by entering a first personal identification number on buttons 18 comprising the keypad on the ATM 12.

Figure 4:
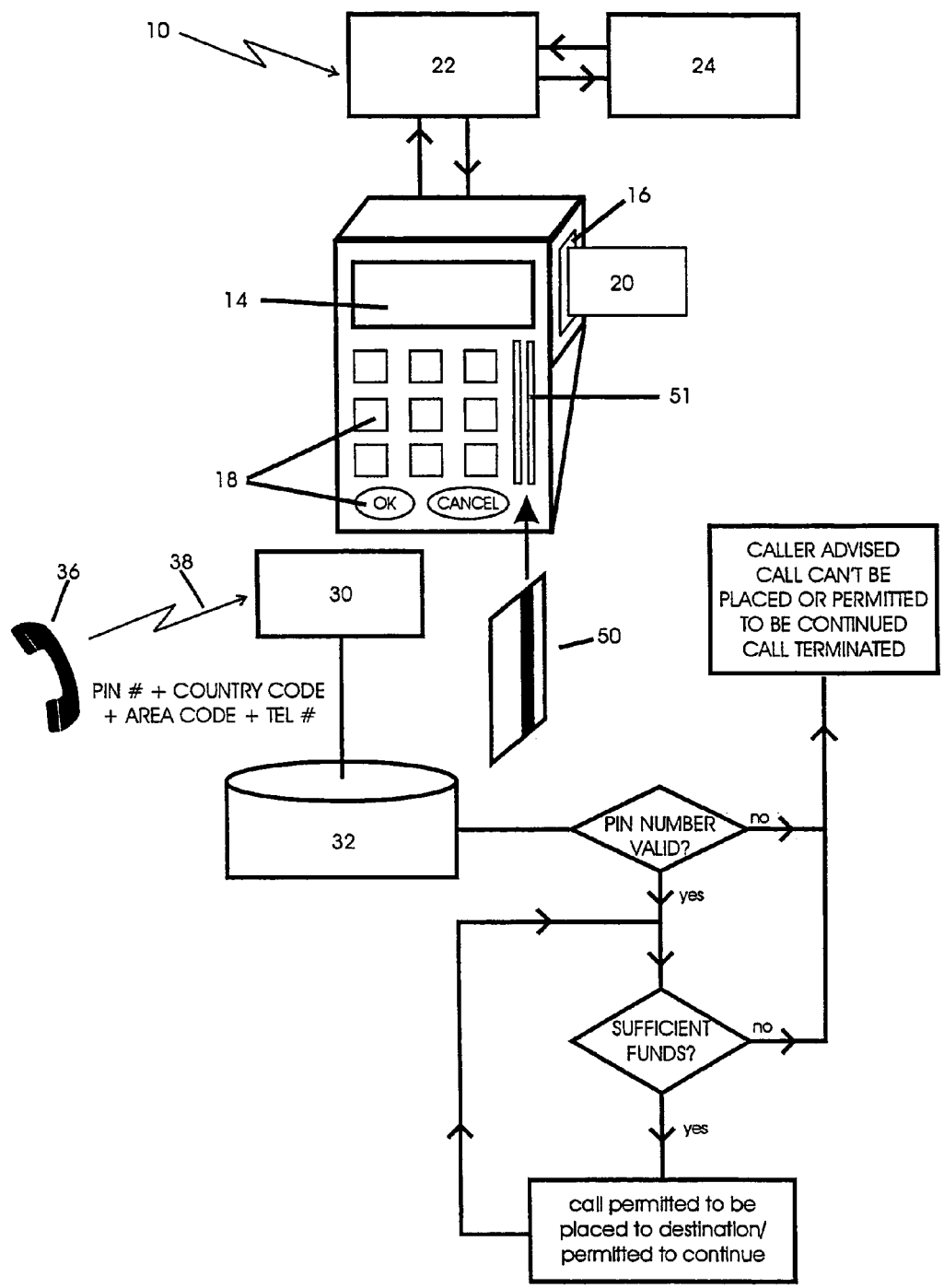
FIG. 4 is a schematic illustration of the components and apparatus used in the method of the present invention, where the device being used to dispense the PIN is a point-of-sale terminal.

FIG. 4 shows apparati 10 for use in the method of the present invention, where the device being used to dispense the PIN is a point-of-sale (POS) terminal 13. Such POS terminal 13 is of a type typically provided to retail customers of retail institutions, and is provided with a liquid crystal or other type of visual display screen 14, a keypad comprising a series of buttons 18 for inputting selections and keying in numbers, and an account statement printer 16. Such POS terminal 13 is typically linked to a network host computer 22 operated by the financial institution or bank with which the POS terminal 13 is associated, for permitting clients of such retail institutions to access their accounts with the financial institution via such POS terminal 13. Such POS terminal 13 either itself or through the network host computer 22 as shown in FIG. 4 is typically linked to an electronic clearing house 24 to provide interface with accounts held by other financial institutions other than the financial institution with which POS terminal 13 may be associated.

A patron typically accesses the POS terminal 13 through provision of an encoded card 50, and by entering a first personal identification number on buttons 18 comprising the keypad on the POS terminal 13.

The various methods of the present invention will now be described, with reference to FIGS. 1–4 of the drawings. In general, description of the method of the invention with respect to an ATM 12 is generally equally applicable to the method of the invention utilizing a POS terminal 13, and vice versa, unless specifically set out to the contrary. When reference to a device is made, such reference is understood to comprise either an ATM 12 as shown in FIG. 3, or a POS terminal 13 as shown in FIG. 4.

In one of its broad aspects, the method of the present invention comprises supplying an ATM 12 (FIG. 3) or a network host 22 with which a POS terminal may be in pre-existing communication with (see FIG. 4) with a plurality of second PIN numbers. Such second PIN numbers may be loaded into a Read Only Memory (ROM) (not shown) onboard the ATM 12. Alternatively, and more preferably, second PIN numbers are provided to the network host computer 22 of the host financial institution with which the ATM 12 or POS terminal 13 interfaces (see FIGS. 3 & 4, respectively), and loaded therein on a ROM chip or peripheral data storage device, such as a hard drive, CD-ROM, or the like. Each of the second PIN numbers, which may be in the form of a numeric or alpha-numeric code sequence of digits/alpha-numeric characters, are provided by telephone service providers 30 and are capable of being recognized by such service providers 30 in the manner more fully set out below. Alternatively, an intermediary entity may purchase a block of pre-paid telephone time from a telephone service provider 30, ascribe second PIN numbers for individual time allotments totalling the block of purchased telephone time, and thereafter supply the second PIN numbers to the telephone service provider 30 for its use in using them in the manner hereinafter described. Each of such second PIN numbers are adapted, when a patron who has purchased a (preferably unique) second PIN number supplies such second PIN number to an associated telephone service provider 30, to permit the service provider 30 to confirm the validity of such PIN number as being a valid number and one which designates a pre-paid quantity of telephone time. Typically the service provider 30 provides a toll-free 1-800 number or the like which may be dialed by a patron. Upon dialing such 1-800 number the patron is queried for and then provides (usually through a series of keyed-in entries on the alpha-numeric buttons on a telephone) the purchased second PIN number, and immediately thereafter enters the digits of the telephone number to which he desires to place a call, and the patron is connected to such number (or additional numbers as the patron may dial, each time keying in the second PIN number) for the duration of the purchased telephone time.

A patron who accesses an ATM 12 or POS terminal 13 through provision to such device of an encoded card 50 and a first PIN number is queried whether the patron wishes to purchase a quantity of telephone time. This query may take the form of a single query, appearing on the visual display screen 14 if only one pre-determined quantity of pre-paid telephone time is available for purchase. Alternatively, such may take the form of two queries, namely whether telephone time is desired to be purchased, and if so the amount of telephone time desired to be purchased which may be selected from a plurality of pre-determined fixed quantities of telephone times displayed on the display screen 14. Affirmative responses and selections are entered by the patron on one of the buttons 18 on the keyboard of the ATM 12 or POS terminal 13. The patron is thereafter queried as to whether the patron desires to charge the patron's credit card or debit the patron's bank account. In the event the patrons desires to charge the patron's bank account, verification through an electronic clearing house 24 (which includes the financial institution with which the ATM 12 or POS terminal 13 is associated) is conducted to verify that the patron has sufficient funds to purchase the selected quantity of telephone time, and the account debited for the amount of purchased telephone time. In the event the patron desires to charge a credit card (which typically can only be done if the encoded card 50 is encoded with the patron's credit card number), verification occurs through an electronic clearing house 24 to ensure the quantity of purchased telephone time may be charged to the card, and if so the credit card charged for such amount. The ATM 12 or POS terminal thereafter proceeds to select one of the plurality of second PIN numbers which have been pre-provided as discussed previously, and thereafter proceeds to print the selected second PIN number on paper 20 normally made available to the account statement printer 16 of ATM 12 or POS terminal 13, and thereafter provided to the patron.

Figure 1:
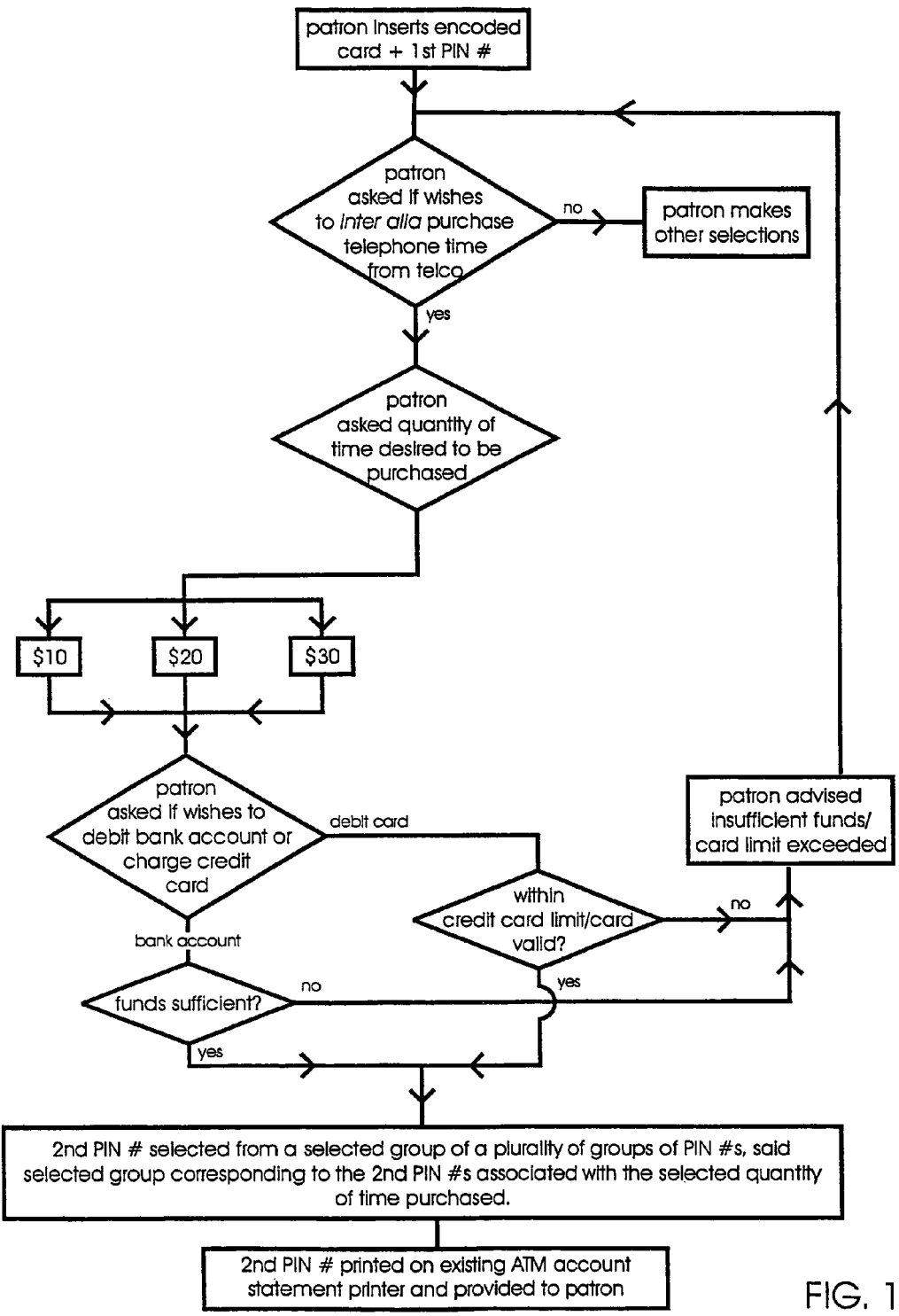
FIG. 1 is schematic representation of a first particular embodiment of the method of the present invention for providing a patron with a pre-paid quantity of telephone time from an existing ATM machine.
Figure 2:
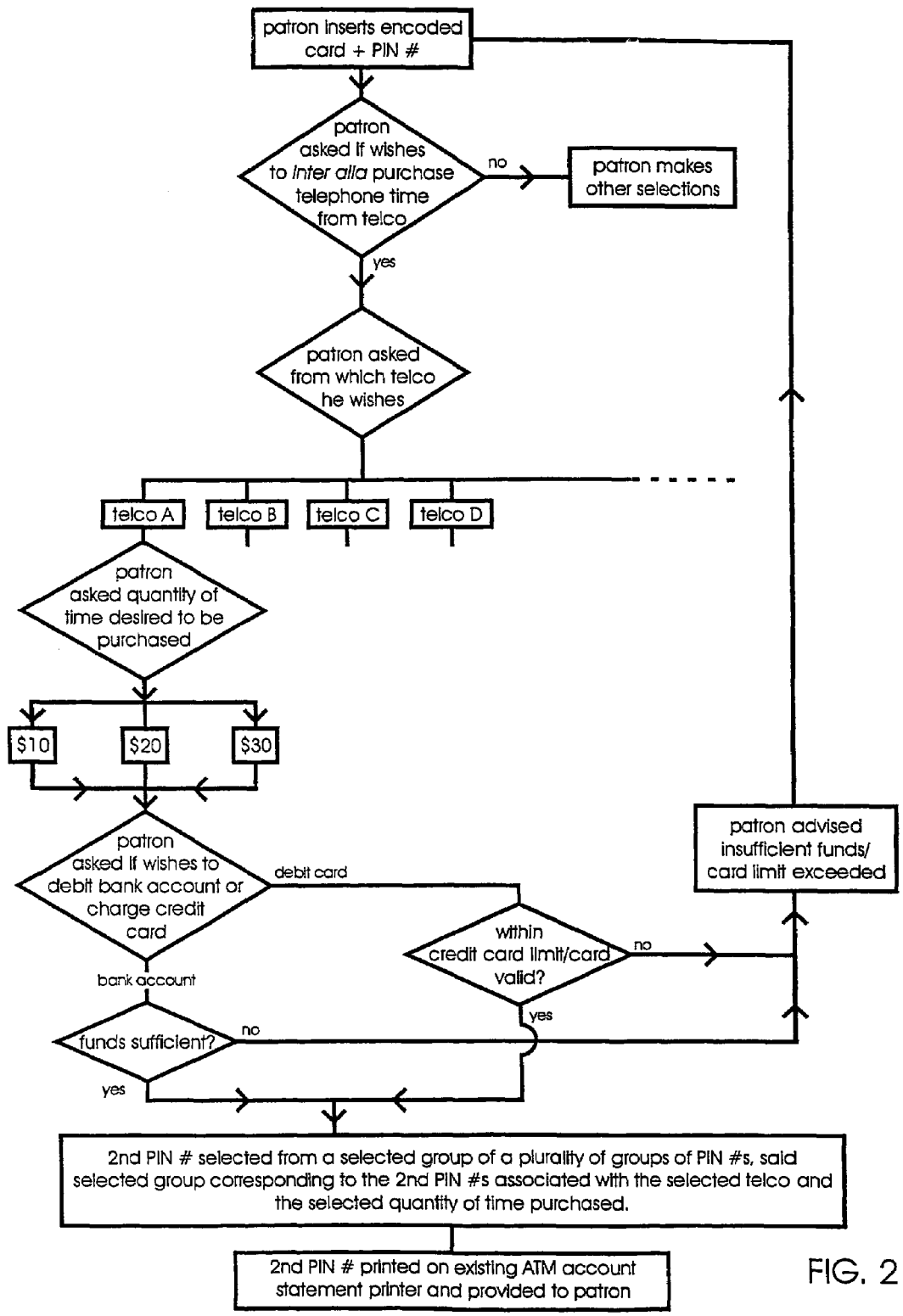
FIG. 2 is a further preferred embodiment of a method of the present invention for providing a patron with a pre-paid quantity of telephone time from an existing ATM machine, wherein the patron is given not only a selection of pre-paid quantities of time to chose from, but is further given a selection of telco's (ie telephone service providers) in which to purchase hi/her desired quantity of pre-paid telephone time.

In a preferred embodiment, where it is desired to give a patron a choice of pre-determined quantities of telephone time (see FIG. 1), the supplied second PIN numbers provided to the ATM 12 or POS terminal 13 in the manner described above are broken down into groups of second PIN numbers. Each second PIN number in a respective group of second PIN numbers is recognized by the telephone service provider 30 as permitting telephone service for a pre-determined quantity of time (such as $10, $20, or $30, as shown in FIG. 1). Each second PIN number within a respective group provides a different quantity of pre-paid telephone time than second PIN numbers within another group.

In yet a further preferred embodiment, where it is desired to give a patron a choice of telephone service providers 30 to choose from (eg. telephone service provider A ("Telco A"), telephone service provider ("Telco B), etc., etc., as well as a choice of pre-paid time from each telephone service provider 30, a plurality of groups of second PIN numbers from each Telco A, B, etc. are provided to the ATM 12 or the network host computer 22 interfacing with such ATM 12 or POS terminal 13 in the manner previously described, each group corresponding to a series of second PIN numbers corresponding to pre-paid service which would be supplied by a particular telephone service provider. For example, second PIN numbers associated with Telco A may have an "A" prefix, while those second PIN numbers associated with Telco may have a "B" pre-fix or suffix. Each of the second PIN numbers in a particular group are sub-divided into sub-groups, with each second PIN number in a particular sub-group providing a pre-paid quantity of telephone time, with the pre-determined quantity of time associated with second PIN numbers within one sub-group being different from the pre-determined quantity of time associated with second PIN numbers within another of the sub-groups. For example, as may be seen from FIG. 2, a patron is give a choice of telephone service providers 30 (Telco A, Telco B, etc), and in respect of each telephone service provider a choice of three pre-determined quantities of telephone time ($10, $20, and $30), prior to be thereafter being asked to select the desired mode of payment.

The method of the present invention, where the patron purchases telephone time for a wireless telephone 36, lends itself to certain advantages, namely not having to supply the second PIN number each and every time the patron places a call on the wireless telephone 36. Such method takes advantage of the fact that each wireless telephone 36 not only has a unique 10 digit mobile identification telephone number (MIN), but also possesses a special electronic identification serial number (ESN) used by the telephone service provider 30 to identify the wireless telephone 36 and to transmit to it. Accordingly, in this particular embodiment of the invention, with reference to FIGS. 3 and 4, upon the patron purchasing a second PIN number, either printed on paper 20 or being provided by display 14 of ATM 12 or POS terminal 13, the patron places a call to the associated telephone service provider 30 from whom pre-paid telephone time was purchased. The second PIN number (typically a 10 digit numeric or alpha-numeric group of characters) is provided to the telephone service provider 30 by dialing a dedicated number, typically a 1-800 number or the like, and keying in via the alpha numeric keypad on the wireless telephone, the second PIN number. The telephone service provider 30, when provided with the second PIN number in this manner, is able to correlate the existing telephone number of the wireless telephone 36 when it receives the radio frequency signal 38 (comprising the wireless telephone's ESN and/or MIN) from the wireless telephone 36 with a corresponding patron account maintained by the service provider 30 on a computerized account system 32 which telephone service providers 30 typically maintain for keeping track of customer accounts. The patron/customer's account is then immediately credited with the amount of purchased telephone time. Thereafter, it is no longer necessary for the patron to provide the second PIN number to the telephone service provider, in order to be connected with a dialed telephone number, since the telephone service provider can simply reference the patron's account upon receiving the wireless signal 38 containing the special identification code (MIN and/or ESN) which is evident from the call placed by the patron over wireless telephone 36.

Although the disclosure describes and illustrates the preferred embodiments of the invention, it is understood that the invention is not limited to these particular embodiments. Many variations and modifications will now occur to those skilled in the art. For a definition of the invention, reference is made to the appended claims.

What is claimed is:

1. A method for providing a second PIN number from a POS terminal in communication with a host server, to a patron of said POS terminal, without hardware changes to said POS terminal and without such POS terminal contacting a telephone service provider prior to or during the dispensing of said second PIN number to said patron, to permit said patron access via said second PIN number to a fixed quantity of prepaid telephone time from at least one of a plurality of telephone service providers, said POS terminal vending items other than second PIN numbers, said method comprising in combination:

a) ordering a pre-determined amount of telephone time from each of a plurality of telephone service providers, wherein each of the plurality of telephone service providers has ascribed second PIN numbers to individual allotments of telephone time;

b) thereafter, causing the ascribed second PIN numbers to be supplied to the host server in a common form, each of said second PIN numbers when provided to a patron of such POS terminal during a transaction and subsequently supplied by the patron to the telephone service provider adapted to allow telephone service for said patron for said individual allotment of telephone time, c) causing said second PIN numbers to be stored in the common form on the host server which interfaces with said POS terminal;

d) causing a patron of such POS terminal, who accesses the POS terminal by providing the POS terminal with an encoded credit card or bank debit card and a first PIN number, to be queried as to whether the patron wishes to purchase telephone time;

e) in response to input from said patron desiring to purchase telephone time, causing said patron to be queried as to whether the patron desires to charge the patron's credit card or debit the patron's bank account;

f) in the event that the patron desires to charge the patron's bank account, causing the host server to cause a verification that the patron has sufficient funds to purchase said quantity of telephone time, and cause a debiting of such account;

g) in the event the patron desires to charge the patron's credit card, causing the host server to cause a verification that the quantity of time desired to be purchased may be charged to said credit card, and cause a charging of said credit card;

h) upon satisfaction of f) or g) above, causing the host server to select one of said second PIN numbers; and i) causing said selected second PIN number to be provided from the host server to such patron by printing said second PIN number on said POS terminal's existing account statement printer or alternatively displaying said second PIN number on said POS terminal's visual display.

2. The method as claimed in claim 1, wherein said step f) comprises the step of causing the host server to cause a verification of such funds through an electronic clearing house communicating with said host server.

3. The method as claimed in claim 2, wherein said step g) comprises the step of causing the host server to cause the verification through said electronic clearing house communicating with said host server.

4. A method for providing a second personal identification number (PIN) number from a device comprising a conventional automated teller machine (ATM) or a point-of sale (POS) terminal, having a display screen and printing capability and a pre-existing communication capability with an existing host server operated by a financial institution, to a patron of said device who accesses said device through provision to said device of an encoded card and first personal identification number (PIN), without hardware modifications to said device, and without additional communication links to a telephone service provider, to permit said patron access via said second PIN number to a fixed quantity of prepaid telephone time from at least one of a plurality of telephone service providers, said ATM and said POS terminal vending items other than second PIN numbers, said method comprising the steps of:

a) ordering a block of telephone time from each of a plurality of telephone service providers wherein each of the plurality of telephone service providers has ascribed second PIN numbers to individual allotments of telephone time, such allotments of telephone time together totaling substantially the ordered block of telephone time;

b) thereafter, causing the ascribed second PIN numbers to be supplied to the host server in a common form;

c) causing said second PIN numbers to be stored in the common form on the host server which interfaces with said ATM and which is not a server operated by the telephone service provider;

d) causing to be made available to said device via said host server said second PIN numbers, each of said second PIN numbers adapted, when provided by said patron during a telephone call to one of said telephone service provider, to allow telephone service for the patron for a period of time up to said individual allotment of telephone time;

e) causing said patron of said device to be queried as to whether the patron wishes to purchase telephone time;

f) causing the host server to cause a verification that the patron has sufficient funds to purchase said quantity of telephone time, and charging such funds for said quantity of time;

g) upon satisfaction of f) above, causing the host server to select one of said second PIN numbers; and, h) causing the host server to cause said device to print said selected second PIN number and provide it to such patron via the ATM or POS's existing statement printer, without the ATM or POS contacting the telephone service provider prior to, or during, the dispensing of said second PIN number from said device.

5. The method as claimed in claim 4, wherein said funds comprise funds held by said patron in a bank account.

6. The method as claimed in claim 4, wherein said funds comprise funds which may be advanced by charging a credit card.

7. The method as claimed in claim 4, further comprising the step after step e) of:

in response to input from said patron as to whether the patron desires to purchase telephone time, causing said patron to be queried as to whether the patron desires to charge the patron's credit card or to debit the patron's bank account;

in the event that the patron desires to charge the patron's bank account, causing the host server to cause a verification through an electronic clearing house coupled to the host server that the patron has sufficient funds to purchase said quantity of telephone time, and causing a charging said bank account for said quantity of time; and in the event the patron desires to charge the patron's credit card, causing the host server to cause a verification through the electronic clearing house that the quantity of time desired to be purchased may be charged to said credit card, and causing charging said credit card for said quantity of time.

8. The method for providing a quantity of pre-paid telephone time from a device as claimed in claim 4, wherein said second PIN numbers comprise a plurality of groups of second PIN numbers, each second PIN number in a respective group of said groups of second PIN numbers permitting telephone service for a pre-determined quantity of time, each second PIN number within a respective group providing a different quantity of pre-paid telephone time than second PIN numbers within another group, further comprising the steps of:

causing said patron to be queried in step e) as to what quantity of a number of predefined quantities of telephone time such patron wishes to purchase; and in response to input from said patron as to the particular quantity of telephone time desired to be purchased, causing the host server to select a second PIN number from a respective group of second PIN numbers which provides telephone time corresponding to the particular quantity of pre-defined quantities of telephone time selected by said patron.

9. The method for providing a quantity of telephone time from a device as claimed in claim 4, further comprising, after or at the same time as step e), causing the patron of said device to be queried as to whether the patron wishes to purchase telephone time from a selected list of telephone service providers.

10. A method for providing a second PIN number from a device comprising a conventional point-of sale (POS) terminal or automated teller machine (ATM) which is operatively connected to a host server operated by a financial institution, to a patron of said device, without hardware modifications to said device and without additional communication links to a telephone service provider, to permit said patron access to a fixed quantity of prepaid telephone time from at least one of a plurality of telephone service providers via said second PIN number and without said device contacting said telephone service provider prior to or during dispensing said second PIN from said device, said POS terminal or ATM vending items other than second PIN numbers, said method comprising the steps of:

a) ordering a pre-determined amount of telephone time from each of a plurality of telephone service providers, wherein each of the plurality of telephone service providers has ascribed second PIN numbers to individual allotments of telephone time b) thereafter, causing the ascribed second PIN numbers to be supplied to the host server in a common form, each of said second PIN numbers adapted, when provided to a patron of such device and subsequently supplied by the patron to the telephone service provider, to allow telephone service for said patron for said individual allotment;

c) causing said second PIN numbers to be stored in the common form on the host server which interfaces with said ATM or POS terminal and which is not a server operated by the telephone service provider;

d) causing a patron of such device, who accesses the device by providing the device with an encoded card and a first PIN number, to be queried as the whether the patron wishes to purchase telephone time;

e) in response to a positive reply, causing the host server to cause a verification that the patron has sufficient funds to purchase said quantity of telephone time, and cause a debiting of such funds, f) causing the host server to select a second PIN number; and g) causing said selected second PIN number to be provided from the host server to such patron via the ATM or POS's existing statement printer or visual display associated with such device.

11. The method as claimed in claim 10, wherein said funds constitute funds held by said patron in a bank account.

12. The method as claimed in claim 10, wherein said funds constitute funds which may be advanced by charging a credit card.

13. The method as claimed in claim 10, further comprising the step after step d) of:

in response to input from said patron as to whether the patron desires to purchase telephone time, causing said patron to be queried as to whether the patron desires to charge the patron's credit card or to debit the patron's bank account;

in the event that the patron desires to charge the patron's bank account, causing the host server to cause a verification through an electronic clearing house coupled to the host server that the patron has sufficient funds to purchase said quantity of telephone time, and cause a charging of said bank account for said quantity of time; and in the event the patron desires to charge the patron's credit card, causing the host server to cause a verification through the electronic clearing house that the quantity of time desired to be purchased may be charged to said credit card, and cause a charging of said credit card for said quantity of time.

14. The method as claimed in claim 13, wherein said step of causing the host server to cause a verification that the patron has sufficient funds to purchase said quantity of telephone time comprises the step of causing the host server to cause a verification of the sufficiency of such funds through said electronic clearing house communicating with said device.

15. The method as claimed in claim 14, wherein said step of causing the host server to cause a verification that the quantity of time desired to be purchased may be charged to said credit card comprises the step of causing the host server to cause the verification through said electronic clearing house communicating with said device.

16. A method for crediting, via a device comprising a conventional POS terminal or a conventional ATM, having pre-existing communication capability with a host server operated by a financial institution, a quantity of predetermined telephone time to a patron who possesses a wireless telephone having a pre-assigned telephone number, which permits said patron, after the initial provision by said patron of a second personal identification number (PIN) to a telephone service provider, to thereafter utilize said telephone for a period up to said quantity of pre-determined quantity of telephone time without having at the time of each subsequent telephone call to provide said telephone service provider with said second PIN number prior to being permitted to make said telephone call without hardware modifications to said device and without communication links to said telephone service provider, said ATM or POS terminal vending items other than second PIN numbers, said method comprising in combination:

a) obtaining a block of telephone time from each of a plurality of telephone service providers; wherein each of the plurality of telephone service providers has ascribed second PIN numbers to individual allotments of telephone time;

b) thereafter, causing the ascribed second PIN numbers to be supplied to the host server in a common form;

c) causing said second PIN numbers to be stored in the common form on the host server which interfaces with said ATM and which is not a server operated by the telephone service provider;

d) causing the host server to make available to the device said second PIN numbers, each of said second PIN numbers being ascribed by one of the plurality of telephone service providers prior to a patron attempting to utilize said device to purchase telephone time;

e) causing a patron of said device, who accesses said terminal device through provision to the terminal device of an encoded card and a first personal identification number (PIN), to be queried as to whether the patron wishes to purchase telephone time;

f) causing said patron to be queried as to said quantity of time desired to be purchased;

g) causing the host server to cause a verification that the patron has sufficient funds to purchase said desired quantity of telephone time;

h) causing the host server to cause a debiting such funds;

i) causing the host server to select said second PIN number from a plurality of second PIN numbers, each of said second PIN numbers adapted, when supplied by said patron during a telephone call to a telephone service provider, to allow telephone service for the patron for a period of time up to said quantity of purchased time, the plurality of second PIN numbers being grouped into a plurality of groups of second PIN numbers, each group of second PIN numbers corresponding to a different quantity of time to be purchased;

j) causing the host server to provide said selected second PIN number to such patron via the ATM or POS's existing statement printer or visual display associated with such device, without said device contacting the telephone service provider prior to, or during dispensing said second PIN number to said patron;

k) the telephone service provider corresponding to the selected second PIN receiving said selected second PIN number from said patron;

l) the telephone service provider corresponding to the selected second PIN correlating the pre-assigned telephone number of said wireless telephone with a corresponding account held by said telephone service provider corresponding to the selected second PIN in respect of said patron; and m) the telephone service provider corresponding to the selected second PIN crediting said account with said quantity of pre-determined telephone time purchased by said patron as ascertained from said second PIN number.

17. The method as claimed in claim 16, wherein such funds constitute funds held by said patron in a bank account.

18. The method as claimed in claim 16, wherein said funds constitute funds which may be advanced by charging a credit card.

19. The method as claimed in claim 16, further comprising the step after step e) of:
in response to input from said patron as to whether the patron desires to purchase telephone time, causing said patron to be queried as to whether the patron desires to charge the patron's credit card or to debit the patron's bank account;
in the event that the patron desires to charge the patron's bank account, causing the host server to cause a verification through an electronic clearing house coupled to the host server that the patron has sufficient funds to purchase said quantity of telephone time, and cause a charging of said bank account for said quantity of time; and
in the event the patron desires to charge the patron's credit card, causing the host server to cause a verification through the electronic clearing house that the quantity of time desired to be purchased may be charged to said credit card, and cause a charging of said credit card for said quantity of time.

20. The method as claimed in claim 16, wherein:
said wireless telephone possesses a specific frequency and identification code;
said selected second PIN number is received from said patron by way of a telephone call from said patron on said wireless telephone; and
said pre-assigned telephone number is correlated to said account of said patron when said telephone call is received from said patron.

21. The method as claimed in claim 20, said telephone number of said wireless telephone ascertained by said telephone service provider at the time said patron communicates said selected second PIN number to said service provider, said service provider thereafter matching said telephone number with said account and subsequently crediting said account with said predetermined quantity of telephone time.

22. The method as claimed in claim 1, wherein said step of causing the host server to select one of said second PIN numbers comprises the step of said POS interfacing with said host server and being provided with a second PIN number having an associated allotted telephone time.

23. The method as claimed in claim 4, wherein said step of causing the host server to select one of said second PIN numbers comprises the step of said device interfacing with said host server and being provided with a second PIN number having an associated allotted telephone time.

24. The method as claimed in claim 10, wherein said step of causing the host server to select one of said second PIN numbers comprises the step of said device interfacing with said host server and being provided with a second PIN number having an associated allotted telephone time.

25. The method as claimed in claim 16, said step i) comprises the step of said device interfacing with said host server and being provided with a second PIN number having an associated allotted telephone time.

26. The method as claimed in claim 1, wherein each of the plurality of telephone service providers ascribes the second PIN numbers to individual allotments of telephone time by ascribing a plurality of groups of second PIN numbers; second PIN numbers with one group of said plurality of groups of second PIN numbers having ascribed thereto a different allotted quantity of telephone time than said second PIN numbers within another of said plurality of groups of second PIN numbers.

27. The method as claimed in claim 4, wherein each of the plurality of telephone service providers ascribes the second PIN numbers to individual allotments of telephone time by ascribing a plurality of groups of second PIN numbers; second PIN numbers with one group of said plurality of groups of second PIN numbers having ascribed thereto a different allotted quantity of telephone time than said second PIN numbers within another of said plurality of groups of second PIN numbers.

28. The method as claimed in claim 10, wherein each of the plurality of telephone service providers ascribes the PIN numbers to individual allotments of telephone time by ascribing a plurality of groups of second PIN numbers; second PIN numbers with one group of said plurality of groups of second PIN numbers having ascribed thereto a different allotted quantity of telephone time than said second PIN numbers within another of said plurality of groups of second PIN numbers.

29. A method for providing a second personal identification number (PIN) from a device comprising a conventional automated teller machine (ATM) or a point-of-sale (POS) terminal, having a printing capability and a pre-existing communication capability with a host server operated by a financial institution, to a patron of said device who accesses said device through provision to said device of an encoded card and first personal identification number (PIN), without hardware modifications to said device and without additional communication links to a telephone service provider, to permit said patron access via said second PIN number to a fixed quantity of prepaid telephone time from at least one of a plurality of telephone service providers, said ATM or POS terminal vending items other than second PIN numbers, said method comprising the steps of:

a) obtaining a block of telephone time from each of a plurality of telephone service providers, wherein each of the plurality of telephone service providers has ascribed second PIN numbers to individual allotments of telephone time;

b) thereafter, causing the ascribed second PIN numbers to be supplied to the host server in a common form;

c) causing said second PIN numbers to be stored in the common form on the host server which interfaces with said device;

d) causing the host processor to make available to said device via said host server said second PIN numbers, each of said second PIN numbers adapted, when provided by said patron during a telephone call to the corresponding telephone service provider, to allow telephone service for the patron for a period of time up to said individual allotment of telephone time, said second PIN numbers being grouped into a plurality of groups of second PIN numbers, each group of second PIN numbers corresponding to a different quantity of allotted time to be purchased;

e) causing the host processor to cause said patron of said device to be queried as to whether the patron wishes to purchase telephone time and the telephone service provider from which the telephone time is to be purchased;

f) causing the host server to cause a verification that the patron has sufficient funds to purchase said quantity of telephone time;

g) upon satisfaction of f) above, causing the host processor to select one of said second PIN numbers having an allotted time corresponding to the amount of time and the telephone service provider selected by said patron; and, causing the device to print said selected second PIN number and providing it to such patron via the ATM or POS's existing statement printer, without the ATM or POS contacting the telephone service provider prior to, or during, the dispensing of said second PIN number from said device.

* * * * *